(12) United States Patent
Hokao

(10) Patent No.: US 6,907,256 B2
(45) Date of Patent: Jun. 14, 2005

(54) MOBILE TERMINAL WITH AN AUTOMATIC TRANSLATION FUNCTION

(75) Inventor: Tomoaki Hokao, Tokyo (JP)

(73) Assignee: NEC Corporation, Tokyo (JP)

(*) Notice: Subject to any disclaimer, the term of this patent is extended or adjusted under 35 U.S.C. 154(b) by 628 days.

(21) Appl. No.: 09/838,055

(22) Filed: Apr. 19, 2001

(65) Prior Publication Data

US 2002/0022498 A1 Feb. 21, 2002

(30) Foreign Application Priority Data

Apr. 21, 2000 (JP) .................................. 2000-120494

(51) Int. Cl.$^7$ ................................................ H04Q 7/20
(52) U.S. Cl. ................. 455/463; 455/550.1; 455/412.1; 704/2; 704/3
(58) Field of Search ........................... 455/556.1, 563, 455/412.1, 414.1, 414.4, 550.1; 704/1, 2, 3, 8, 9, 277, 200, 257

(56) References Cited

U.S. PATENT DOCUMENTS

| | | | | |
|---|---|---|---|---|
| 4,882,681 A | * | 11/1989 | Brotz | .............................. 704/3 |
| 5,268,839 A | * | 12/1993 | Kaji | ............................... 704/3 |
| 5,440,615 A | * | 8/1995 | Caccuro et al. | .......... 379/88.06 |
| 5,841,852 A | | 11/1998 | He | |
| 5,946,376 A | * | 8/1999 | Cistulli | ..................... 379/88.06 |
| 6,175,819 B1 | * | 1/2001 | Van Alstine | ................. 704/235 |
| 6,240,170 B1 | * | 5/2001 | Shaffer et al. | .......... 379/142.15 |
| 6,266,642 B1 | * | 7/2001 | Franz et al. | ................. 704/277 |
| 6,690,932 B1 | * | 2/2004 | Barnier et al. | ........... 455/414.1 |

FOREIGN PATENT DOCUMENTS

| | | | |
|---|---|---|---|
| CN | 1234698 A | 11/1999 | |
| EP | 0 776 140 A1 | 5/1997 | |
| EP | 0 837 611 A2 | 4/1998 | |
| EP | 0 935 378 A2 | 8/1999 | |
| GB | 2 342 202 A | 4/2000 | |
| JP | 7-175813 | 7/1995 | |
| JP | 9-65424 | 3/1997 | |
| JP | 11-110389 | 4/1999 | |
| JP | 11-112665 | 4/1999 | |
| JP | 11-243571 | 9/1999 | |
| WO | WO 98/20665 | * 5/1998 | ............ H04M/1/72 |

OTHER PUBLICATIONS

English abstract of JP 05–110492.
Copy of European Search Report dated Jan. 8, 2004.
Japanese Office Action dated Mar. 5, 2002 and English Translation.
Copy of The People's Republic of China Office Action dated Jun. 13, 2003 (and English translation of same).
Japanese Office Action dated May 28, 2002 with partial English translation.

* cited by examiner

*Primary Examiner*—Sonny Trinh
(74) *Attorney, Agent, or Firm*—Dickstein, Shapiro, Morin & Oshinsky, L.L.P.

(57) ABSTRACT

A mobile terminal of the invention includes a language translation unit and stores in advance a language used in the mobile terminal. When the mobile terminal calls or receives a call, the mobile terminal recognizes a country ID corresponding to a people who is called by the mobile terminal or who calls the mobile terminal, by using a telephone number, notification information of a base station, or a control signal from the mobile terminal. Then, the mobile terminal performs language translation by using a translation pattern determined based on the language used in the mobile terminal and the country ID.

11 Claims, 5 Drawing Sheets

MOBILE TERMINAL WITH AN AUTOMATIC TRANSLATION FUNCTION

BACKGROUND OF THE INVENTION

1. Field of the Invention

The invention relates to a mobile terminal and in particular, to a mobile terminal which is bearable by each user and which can perform receiving and sending operations of information, such as speech or data.

2. Description of the Related Art

Recently, a mobile terminal has been quickly spread worldwide with an outstanding development of a technology and an increase of functions of the mobile terminal. Specifically, such development is led by remarkable progress of communication technology and an IC (Integrated Circuit) technology.

For example, a mobile telephone can be used not only to communicate with domestic people but also to make an international phone call.

Nowadays, using the mobile terminal including a mobile telephone, mobile PC, and others, wherever a user of the mobile terminal goes to or whenever the user uses the mobile terminal, the user can communicates with someone.

Because of improvement of the communication technology and the IC technology, we can receive a great convenience.

In this specification, the mobile terminal is regarded as including all portable terminals which can perform radio communication and display characters, animated images, and still image. Further, the mobile terminal includes a terminal which can output a sound. Also, as described above, the mobile terminal includes a mobile telephone, a mobile PC, a PDA (Personal Digital Assistant), and other portable computers.

However, all users (persons) of the mobile terminal do not always use the same language. If a user of the mobile terminal can not understand a language of another user who intends to communicate with the user (that is, if there is a language barrier between them), they can not understand each other and, as a result, smooth communication or conversation is impossible between them.

Recently, English tends to be used as a common language among people living in different countries. But, it is needless to say that communication among a variety of languages becomes indispensable without relying on English alone. Under the circumstances, even if persons in many areas or many countries can be connected to each other through conventional mobile terminals, it is almost impossible to communicate or understand each other in the true sense of the words.

In Japanese Unexamined Patent Publication (JP-A) No. Hei 11-243571, namely, 243571/1999, proposal has been made about a pager receiver that has a function of translating a message written in one language and received from a transmission station, into another language understood by a bearer. Herein, it is to be noted that such a pager receiver can not send or transmit any message, speech, or data. Therefore, no consideration has been made about a mobile terminal which can sends or transmit any message or data to any other subscriber or station.

SUMMARY OF THE INVENTION

It is, therefore, an object of the invention to provide a mobile terminal which can cope with requirement of foreign people. Thereby, users using the different languages can understand each other and realize smooth communication even if they use different languages.

According to a first aspect of the invention, there is provided a mobile terminal which is bearable by a user and which is capable of performing both of sending and receiving operations. The mobile terminal comprises a storage unit which registers first language information which identifies a first language used by the user in the mobile terminal, a determining unit which determines second language information which identifies a second language, on the basis of language information included in a calling telephone number entered by the user of the mobile terminal or in a reception telephone number received by the mobile terminal, a language translation unit which translates outgoing information from the first language into the second language and/or incoming information from the second language into the first language, and an output unit which outputs the translated information.

According to a second aspect of the invention, there is provided a method of translating incoming/outgoing information at a mobile terminal which is capable of performing receiving and sending operations and which is bearable by a user. The method comprises the steps of fetching first language information which is stored in the mobile terminal and which is representative of a first language used by the user in the mobile terminal, determining a second language from second language information on the basis of language information included in a calling telephone number entered by the user of the mobile terminal or in a reception telephone number sent from an originator who calls the mobile terminal, selecting a proper translation pattern with reference to the combination of the first language and the second language, translating outgoing information from the first language into the second language and/or incoming information from the second language into the first language, using the selected pattern, and outputting the translated incoming information.

According to a third aspect of the invention, there is provided a recording medium readable by a computer, tangibly embodying a program of instructions executable by the computers to perform a method of translating incoming/outgoing information at a mobile terminal which is capable of performing receiving and sending operations and which is bearable by a user. The method comprises the steps of fetching first language information which is stored in the mobile terminal and which is representative of a first language used by the user in the mobile terminal, determining a second language from second language information on the basis of language information included in a calling telephone number entered by the user of the mobile terminal or in a reception telephone number sent from an originator who calls the mobile terminal, selecting a proper translation pattern with reference to the combination of the first language and the second language, translating outgoing information from the first language into the second language and/or incoming information from the second language into the first language, using the selected pattern, and outputting the translated incoming information.

According to a fourth aspect of the invention, there is provided a computer data signal embodied in a carrier wave and representing a sequence of instructions which, when executed by a processor, cause the processor to perform a method of translating incoming/outgoing information at a mobile terminal which is capable of performing receiving and sending operations and which is bearable by a user. The method comprises the steps of fetching first language information which is stored in the mobile terminal and which is representative of a first language used by the user in the mobile terminal, determining a second language from second language information on the basis of language information included in a calling telephone number entered by the user of the mobile terminal or in a reception telephone number sent from an originator who calls the mobile terminal, selecting a proper translation pattern with reference to the combination of the first language and the second language, translating outgoing information from the first language into the second language and/or incoming information from the second language into the first language, using the selected pattern, and outputting the translated incoming information.

According to a fifth aspect of the invention, there is provided a program product comprising, computer readable instructions and a recording medium bearing the computer readable instructions. The instructions are adaptable to enable computers to perform a method of translating incoming/outgoing information at a mobile terminal which is capable of performing receiving and sending operations and which is bearable by a user. The method comprises the steps of fetching first language information which is stored in the mobile terminal and which is representative of a first language used by the user in the mobile terminal, determining a second language from second language information on the basis of language information included in a calling telephone number entered by the user of the mobile terminal or in a reception telephone number sent from an originator who calls the mobile terminal, selecting a proper translation pattern with reference to the combination of the first language and the second language, translating outgoing information from the first language into the second language and/or incoming information from the second language into the first language, using the selected pattern, and outputting the translated incoming information.

DESCRIPTION OF THE PREFERRED EMBODIMENT

According to the invention, an automatic translation (language translation) function is added to a mobile terminal to solve the above described problems. Further, in the invention, the mobile terminal automatically performs, during communication, language translation which is adapted to a user or which is selected by the user by incorporating at least one of functions as follows.

(1) Function for storing a language of the user in the form of a "country (language) ID" into the mobile terminal.

(2) Function for determining a language used in a place where the user is present by using a country ID included in broadcast information from a base station related to the mobile terminal.

As known in the art, each base station radiates the broadcast information within a zone surrounding the base station. In addition, broadcast information includes a variety of data used to communicate between the base station and mobile terminals in the zone. The mobile terminals receive the information through a channel and call (or telephone) or wait on the basis of the data in the broadcast information. In the broadcast information, the country code used in the invention may be included.

(3) Function for determining a language of the other user talking to the user, by using a country ID included in a telephone number sent from the other user prior to communication. When the user calls using the mobile terminal, the mobile terminal determines a language of the other user from a country ID included in a calling telephone number. On the other hand, when the other user calls the user, the mobile terminal of the user determines a language of the other user from a country ID included in a caller telephone number received from the other user's side.

(4) Function for informing the other user of a country ID stored in a mobile terminal of the other user via a control signal.

(5) Function for recognizing a country ID stored in a mobile terminal of the other user by receiving a control signal form the mobile terminal of the other user prior to communication.

By using a current sophisticated IC technology, these functions can be realized in an extremely compact size and at comparatively low costs.

Figure 1:
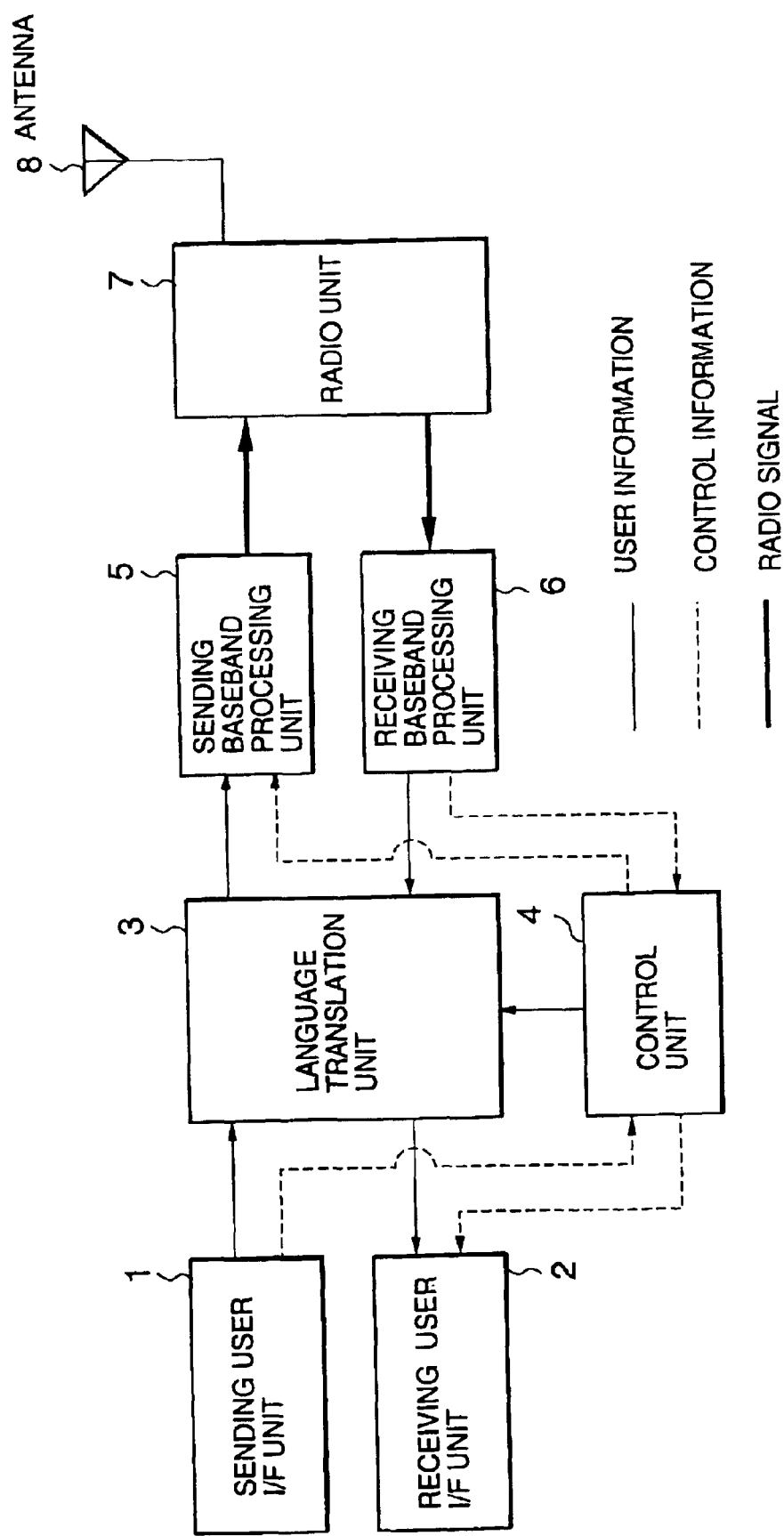
FIG. 1 shows a block diagram of a mobile terminal having an automatic translation function according to an embodiment of the invention.

Next, a mobile terminal illustrated in FIG. 1 has an automatic translation function according to an embodiment of the invention, together with sending and receiving functions. Specifically, the mobile terminal includes a sending user I/F (interface) unit 1, a receiving user I/F (interface) unit 2, a language translation unit 3, a control unit 4, a sending baseband processing unit 5 (hereinafter, "baseband" is abbreviated to "BB"), a receiving BB processing unit 6, a radio unit 7, and an antenna 8.

The sending user I/F unit 1 may includes a microphone or keyboard used to enter user information and control information. The receiving user I/F unit 2 may include a speaker or a monitor used to output the user information and control information to the user.

The language translation unit 3 performs language translation (will be simply called "translation" hereinafter) on the user information entered from the sending user I/F unit 1 or output to the receiving user I/F unit 2, in response to the control unit 4.

The control unit 4 selects a language translation pattern adapted to the user and informs the language translation unit 3 of the pattern. Such selection of the pattern in the control unit 4 is carried out on the basis of user settings entered from the sending user I/F unit 1, broadcast information from the receiving BB processing unit 6, and a calling or originator's telephone number from the sending user I/F unit 1 or the receiving BB processing unit 6.

The language translation unit 3 includes, in general, sets of a dictionary and a translation engine. And each of the sets corresponds to a translation pattern.

The mobile terminal also includes a memory (not shown) storing the user settings, notification information, and the calling telephone number. The notification information is used for notification of a cell or an area in which the mobile terminal is present. Further, the mobile terminal generates a control signal other than the user information, and processes a received control signal.

The sending BB processing unit 5 performs a baseband process on the user information and the control information both of which are to be sent. The receiving BB processing unit 6 performs baseband process on the user information and the control information which are received. The radio unit 7 and the antenna 8 perform sending/receiving via a radio network.

Next, description is made about operations of the mobile terminal of the invention with reference to FIGS. 2 through 5.

Figures 2A, 2B:
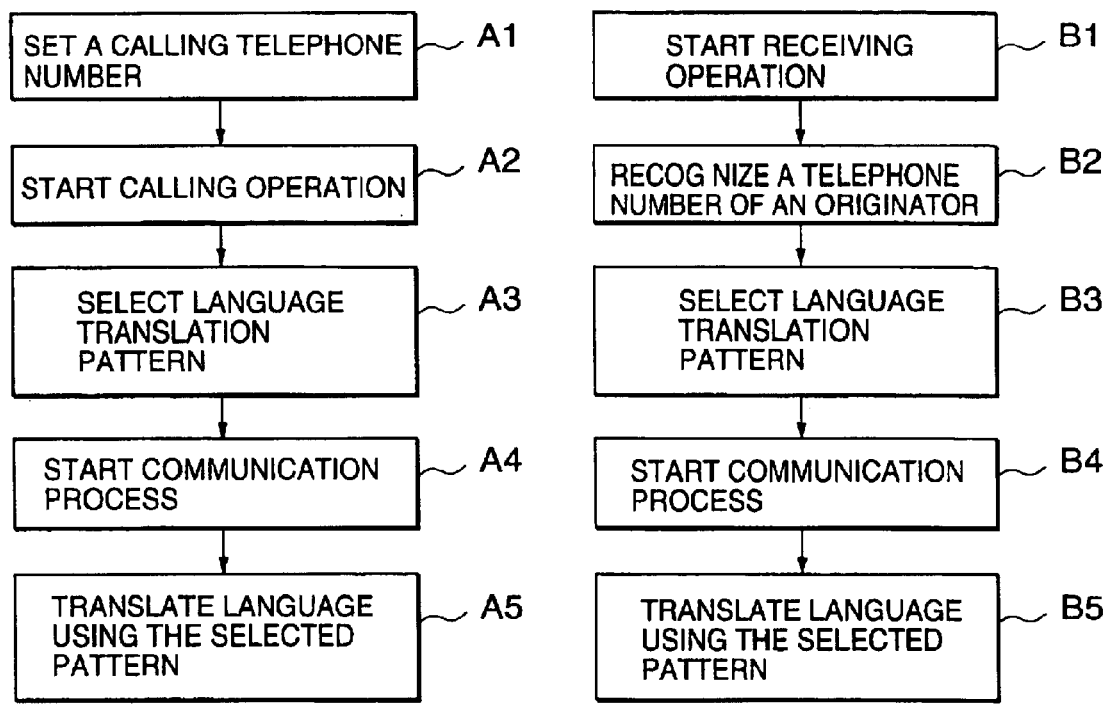
FIG. 2A shows a flowchart for describing operations of a calling process of the mobile terminal shown in FIG. 1.
FIG. 2B shows a flowchart for describing operations of a receiving process of the mobile terminal shown in FIG. 1.

FIG. 2A shows a calling or sending process. At step A1, a user of the mobile terminal enters or inputs a calling telephone number (a telephone number of a subscriber to be called by the user) via an input device, such as the microphone or the keyboard, by sometime referring to a telephone directory.

Herein, it is assumed that the called subscriber uses a telephone or computer located in a home and the telephone and the computer can communicates through a fixed network connected to the home.

After that, calling operation is started in the mobile terminal of the user (step A2). Then, the mobile terminal selects a language translation pattern by comparing a language stored in the own mobile terminal, with a country ID included in the calling telephone number (step A3).

Next, communication process is started (step A4). Finally, in the communication process, data which are received or to be sent are properly and smoothly translated by using the selected language translation pattern (step A5).

FIG. 2B shows a process of receiving message. At first, the mobile terminal starts receiving messages (step B1). Then, the mobile terminal recognizes a telephone number of a subscriber (originator) who calls the user of the mobile terminal (step B2). Such a telephone number of a calling subscriber can be recognized by the use of an originator number notification service, namely, a calling line identification presentation service. Herein, the originator number notification service is generally provided by a telephone company.

Herein, it is also assumed that the calling people uses a telephone or computer located in a home and the telephone or computer communicates through a fixed network connected to the home.

Then, the mobile terminal selects a language translation pattern by comparing the above language stored in the own mobile terminal with a country ID included in the telephone number obtained at the step B2 (step B3). Next, communication process is started (step B4). Finally, in the communication process, data which are received or to be sent are properly and smoothly translated into the selected language by using the selected language translation pattern (step B5).

Figure 3:
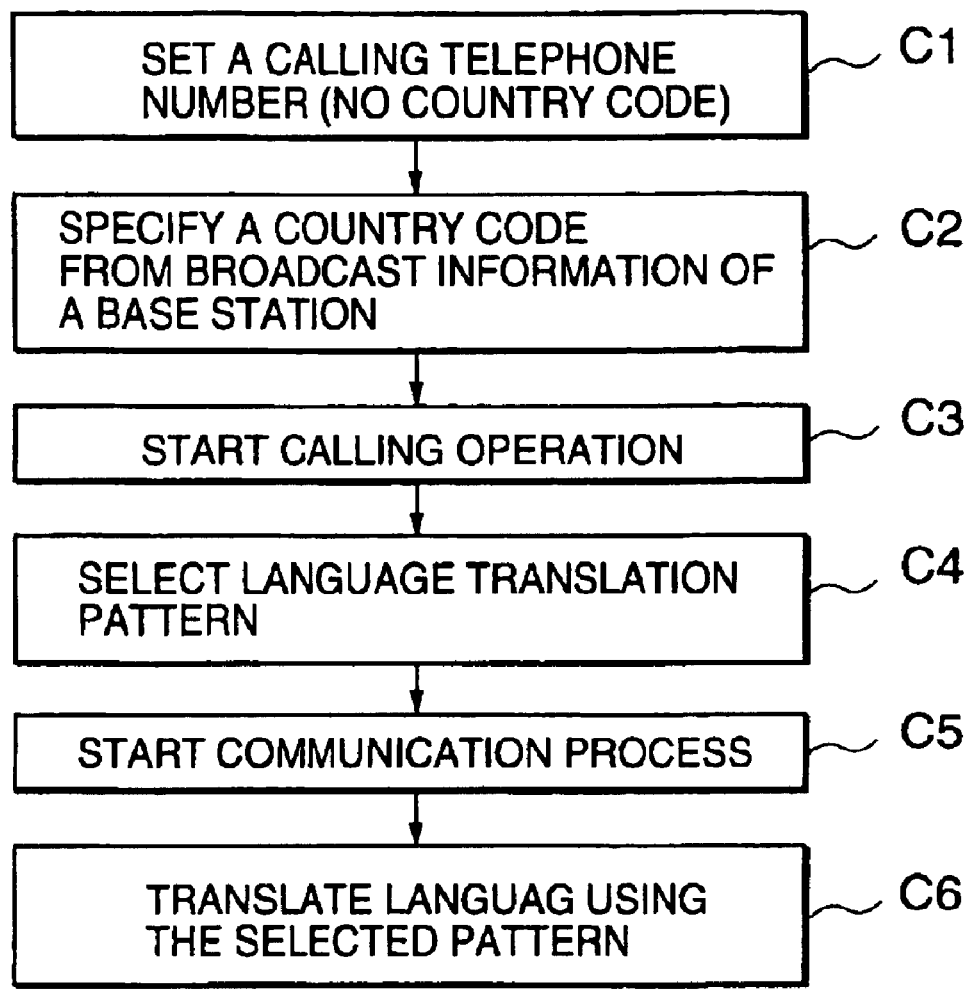
FIG. 3 shows a flowchart for describing operations when the mobile terminal shown in FIG. 1 calls to a domestic fixed network.

Next, description is made about operations executed when the mobile terminal of the invention calls to a domestic fixed network, with reference to FIG. 3.

At first, a user of the mobile terminal enters a calling telephone number (a telephone number of a subscriber to be called by the user) via an input device, such as the microphone or the keyboard (step C1).

Herein, it is assumed that the called subscriber uses a telephone or computer located in a home and the telephone or the computer communicates through a fixed network connected to the home.

In this event, since domestic communication, that is, no international communication with a foreign country is carried out, a country code (namely, a country ID) of the telephone number is not required.

Therefore, the mobile terminal specifies a country ID by fetching a country ID included in broadcast information from a base station related to the mobile terminal (step C2).

Thereafter, calling operation is started (step C3). Then, the mobile terminal selects a language translation pattern by comparing a language which is used and stored in the own mobile terminal with the country ID specified in step C2 (step C4). Next, communication process is started (step C5).

During the communication between the user of the mobile terminal and the called people using non-mobile terminal, the mobile terminal receives and sends languages by properly and smoothly translating them by using the selected language translation pattern (step C6).

Figure 4:
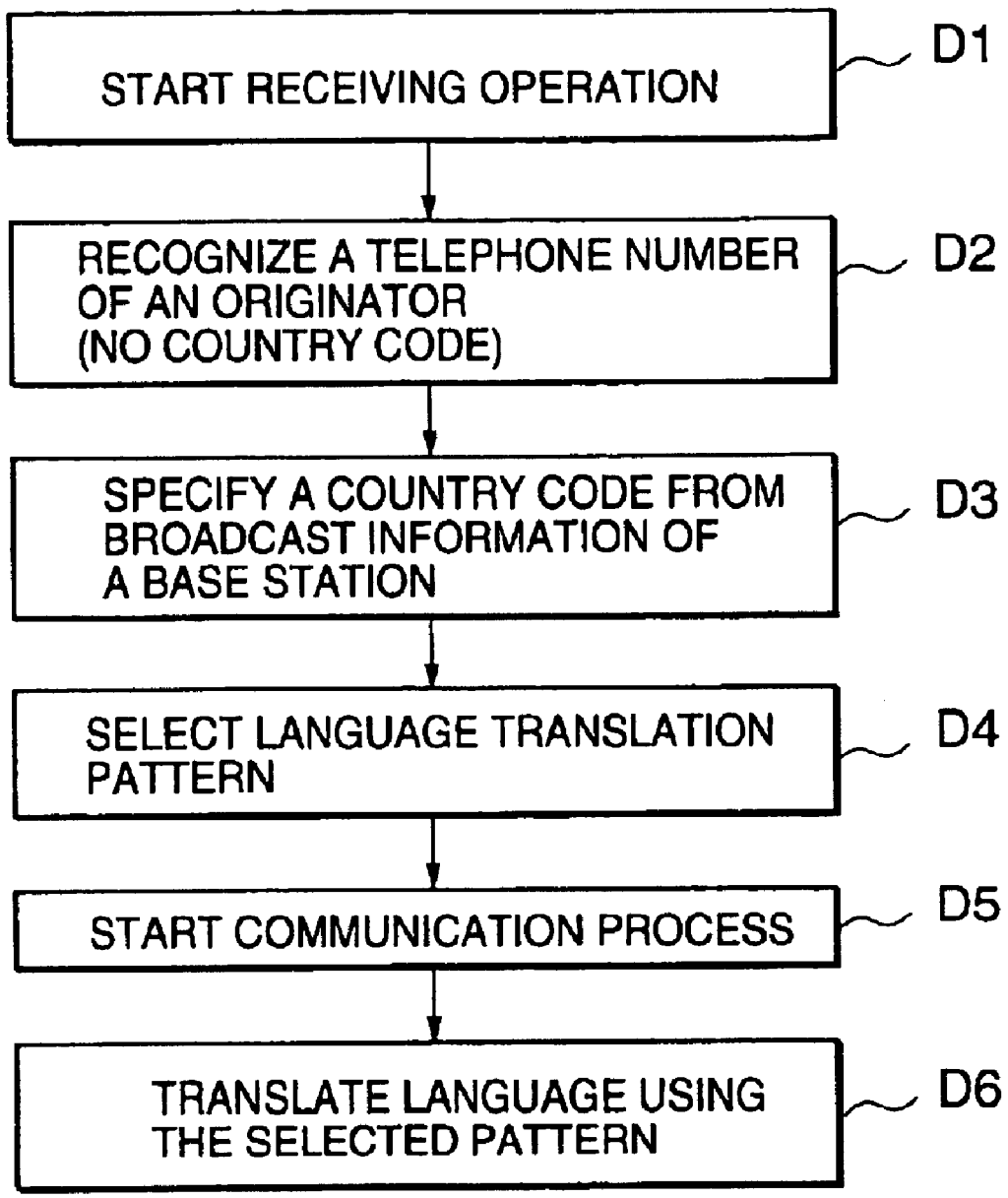
FIG. 4 shows a flowchart for describing operations when the mobile terminal shown in FIG. 1 receives a call from the domestic fixed network.

Next, description is made with reference to FIG. 4 about operations performed when the mobile terminal of the invention receives a call from a domestic fixed network.

At first, the mobile terminal starts receiving messages (step D1). Then, the mobile terminal recognizes a telephone number of a subscriber (originator) who calls the user of the mobile terminal (step D2), using an originator number notification.

Herein, it is assumed that the calling people uses a telephone or computer located in a home communicating through a fixed network to the home.

But, since it is a domestic communication, a country code (a country ID) of the telephone number is included in the telephone number obtained from the originator number notification.

Therefore, the mobile terminal specifies a country ID by specifying a place where the user of the mobile terminal and the calling people are present, from a country ID included in broadcast information from a base station related to the mobile terminal (step D3).

Then, the mobile terminal selects a language translation pattern by comparing the above language which is used and stored in the own mobile terminal with a country ID included in the telephone number obtained in step D3 (step D4). Next, communication process is started (step D5).

Finally, in the communication between the user of the mobile terminal and the calling people using non-mobile terminal, at the mobile terminal, languages which are received or to be sent are properly and smoothly translated by using the selected language translation pattern (step D6).

Figure 5:
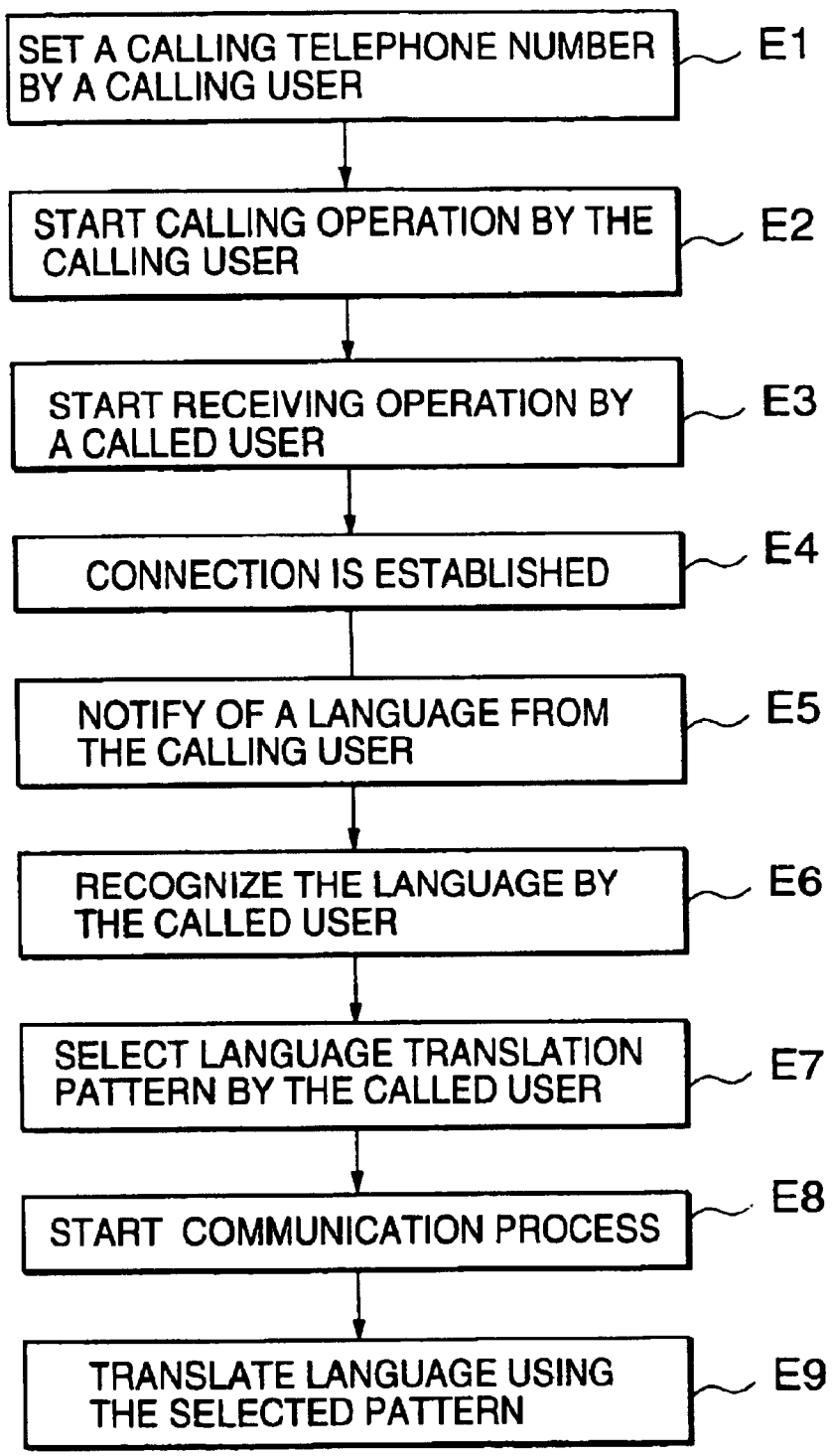
FIG. 5 shows a flowchart for describing operations when the mobile terminals shown in FIG. 1 communicate with each other.

Next, description is made about operations when a communication is made between mobile terminals with reference to FIG. 5.

If a communication is made between two mobile terminals, at least one of the mobile terminals should know a language of the other mobile terminal. Therefore, language translation is performed as shown in FIG. 5. Also, the one mobile terminal is required to communicate a control signal to inform the other mobile terminal of a language used in the one mobile terminal, and a network between them should support this function.

At first, calling user enters a calling telephone number (a telephone number of an object to be called by the calling user) via an input device such as the microphone or the keyboard (step E1).

In this case, since the called terminal is a mobile terminal (a mobile telephone), a country code (a country ID) is not included in the telephone number.

After that, calling operation is started (step E2). Then, the receiving mobile terminal starts a receiving operation (step E3). Further, call connection is established (step E4).

Next, the calling mobile terminal sends a language of own terminal in the form of the control signal to the receiving mobile terminal (step E5). And the receiving mobile terminal receives the control signal and recognizes the language used in the calling mobile terminal (step E6).

Then, the receiving mobile terminal selects a language translation pattern by comparing a language which is used and stored in the own mobile terminal with the language recognized at step E6 (step E7).

Next, communication process is started (step E8). Finally, in the communication process, languages which are received or to be sent are properly and smoothly translated by using the selected language translation pattern (step E9).

Also, about steps E5 to E9, the operations in the receiving mobile terminal may be changed to the operations in the calling mobile terminal.

Further, the method of the invention can be applied to a mobile terminal which can perform communication via a radio network as described above, but the method also can be applied to a communication between terminals each of which is connected to a fixed network such as a telephone settled in a home.

Still further, a program to perform the method of the invention can be provided via a recording medium. A mobile terminal can includes a CPU, a memory, and a recording medium drive. Instructions of the program are loaded into the memory of the mobile terminal via the recording medium driver. And then, according to the instructions, the CPU controls and manages elements of the mobile terminal to execute the method of the invention.

Instead of the recording medium, the instructions may be loaded to the memory via a radio network or other routes.

As described above, description has been made about a configuration and operations of the mobile terminal according to a preferred embodiment of the invention. However, the embodiment of the invention is merely illustrated and it is noted that the scope of the invention should not be limited to the embodiment. It is easily understood for the skilled people in the art that a variety of amendments and modification may be taken for the mobile terminal according to a specific application within the scope of the spirit of the invention.

What is claimed is:

1. A mobile terminal which is bearable by a user and which is capable of performing both of sending and receiving operations, comprising:
   a storage unit which registers first language information which identifies a first language used by the user in the mobile terminal;
   a language information sending unit that sends the first language information to a calling terminal;
   a determining unit which determines second language information which identifies a second language, on the basis of language information included in a calling telephone number entered by the user of the mobile terminal or in a reception telephone number received by the mobile terminal;
   a language translation unit which translates outgoing information from the first language into the second language and/or incoming information from the second language into the first language;
   and an output unit which outputs the translated information.

2. The mobile terminal of claim 1, wherein the language information includes a country code of the telephone number.

3. The mobile terminal of claim 1, further comprising a language information receiving unit which receives the language information from the originator's terminal, wherein the determining unit uses the received language information as the language information to determine the second language.

4. The mobile terminal of claim 1 further comprising a radio communicating unit which communicates via a radio network, wherein the determining unit determines the second language by using the language information included in signals which are radiated from a base station if there are no language information in the calling telephone number or the reception telephone number.

5. The mobile terminal of claim 1, wherein the output unit comprises at least one of a display unit to display characters or images and a loudspeaker to output a sound.

6. A method of translating incoming/outgoing information at a mobile terminal which is capable of performing receiving and sending operations and which is bearable by a user, the method comprising the steps of:
   fetching first language information which is stored in the mobile terminal and which is representative of a first language used by the user in the mobile terminal;
   sending the first language information to a calling terminal if no language information is included in the calling telephone number;
   determining a second language from second language information on the basis of language information included in a calling telephone number entered by the user of the mobile terminal or in a reception telephone number sent from an originator who calls the mobile terminal;
   selecting a proper translation pattern with reference to the combination of the first language and the second language;
   translating outgoing information from the first language into the second language and/or incoming information from the second language into the first language, using the selected pattern; and
   outputting the translated incoming information.

7. The method of claim 6 further comprising a step of receiving the language information from the originator's terminal, wherein the determining step uses the received language information as the language information to determine the second language.

8. The method of claim 6 further comprising a step of communicating via a radio network, wherein the determining step determines the second language by using language information included in signals which are radiated from a base station if there are no language information in the calling telephone number or the telephone number of the originator.

9. A recording medium readable by a computer, tangibly embodying a program of instructions executable by the computers to perform a method of translating incoming/outgoing information at a mobile terminal which is capable of performing receiving and sending operations and which is bearable by a user, the method comprising the steps of:
   fetching first language information which is stored in the mobile terminal and which is representative of a first language used by the user in the mobile terminal;
   sending the first language information to a calling terminal if no language information is included in the calling telephone number;

determining a second language from second language information on the basis of language information included in a calling telephone number entered by the user of the mobile terminal or in a reception telephone number sent from an originator who calls the mobile terminal or in language information sent from the calling terminal;

selecting a proper translation pattern with reference to the combination of the first language and the second language;

translating outgoing information from the first language into the second language and/or incoming information from the second language into the first language, using the selected pattern; and outputting the translated incoming information.

10. A computer data signal embodied in a carrier wave and representing a sequence of instructions which, when executed by a processor, cause the processor to perform a method of translating incoming/outgoing information at a mobile terminal which is capable of performing receiving and sending operations and which is bearable by a user, the method comprising the steps of:

fetching first language information which is stored in the mobile terminal and which is representative of a first language used by the user in the mobile terminal;

sending the first language information to a calling terminal if no language information is included in the calling telephone number;

determining a second language from second language information on the basis of language information included in a calling telephone number entered by the user of the mobile terminal or in a reception telephone number sent from an originator who calls the mobile terminal or in language information sent from the calling terminal;

selecting a proper translation pattern with reference to the combination of the first language and the second language;

translating outgoing information from the first language into the second language and/or incoming information from the second language into the first language, using the selected pattern; and outputting the translated incoming information.

11. A program product comprising, computer readable instructions and a recording medium bearing the computer readable instructions; the instructions being adaptable to enable computers to perform a method of translating incoming/outgoing information at a mobile terminal which is capable of performing receiving and sending operations and which is bearable by a user, the method comprising the steps of:

fetching first language information which is stored in the mobile terminal and which is representative of a first language used by the user in the mobile terminal;

sending the first language information to a calling terminal if no language information is included in the calling telephone number;

determining a second language from second language information on the basis of language information included in a calling telephone number entered by the user of the mobile terminal or in a reception telephone number sent from an originator who calls the mobile terminal or in language information sent from the calling terminal;

selecting a proper translation pattern with reference to the combination of the first language and the second language;

translating outgoing information from the first language into the second language and/or incoming information from the second language into the first language, using the selected pattern; and outputting the translated incoming information.

* * * * *